July 17, 1962 K. HANEKLAUS 3,044,280
ARTICULATED-JOINT TOOTHED COUPLING
Filed Jan. 25, 1961 7 Sheets-Sheet 4

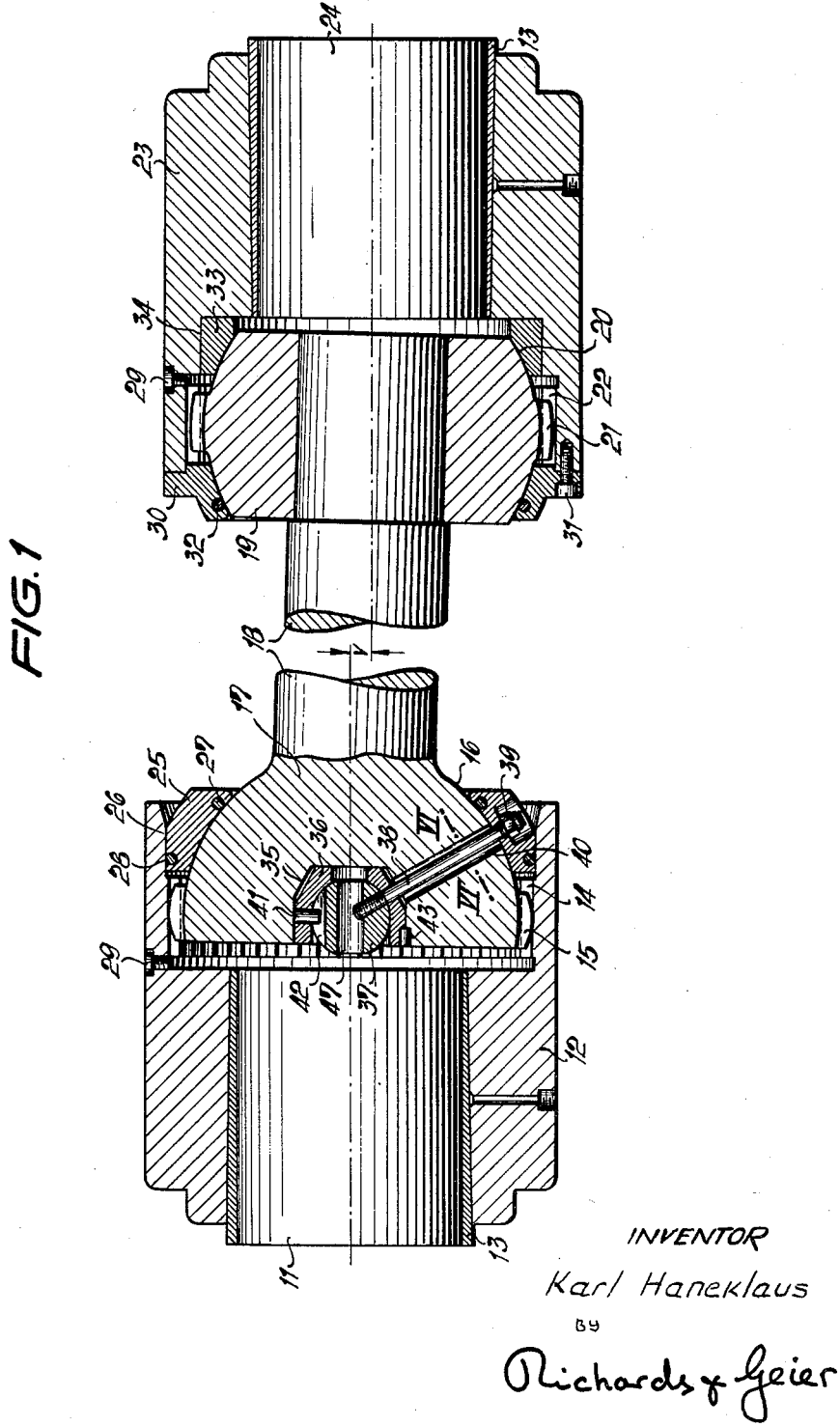

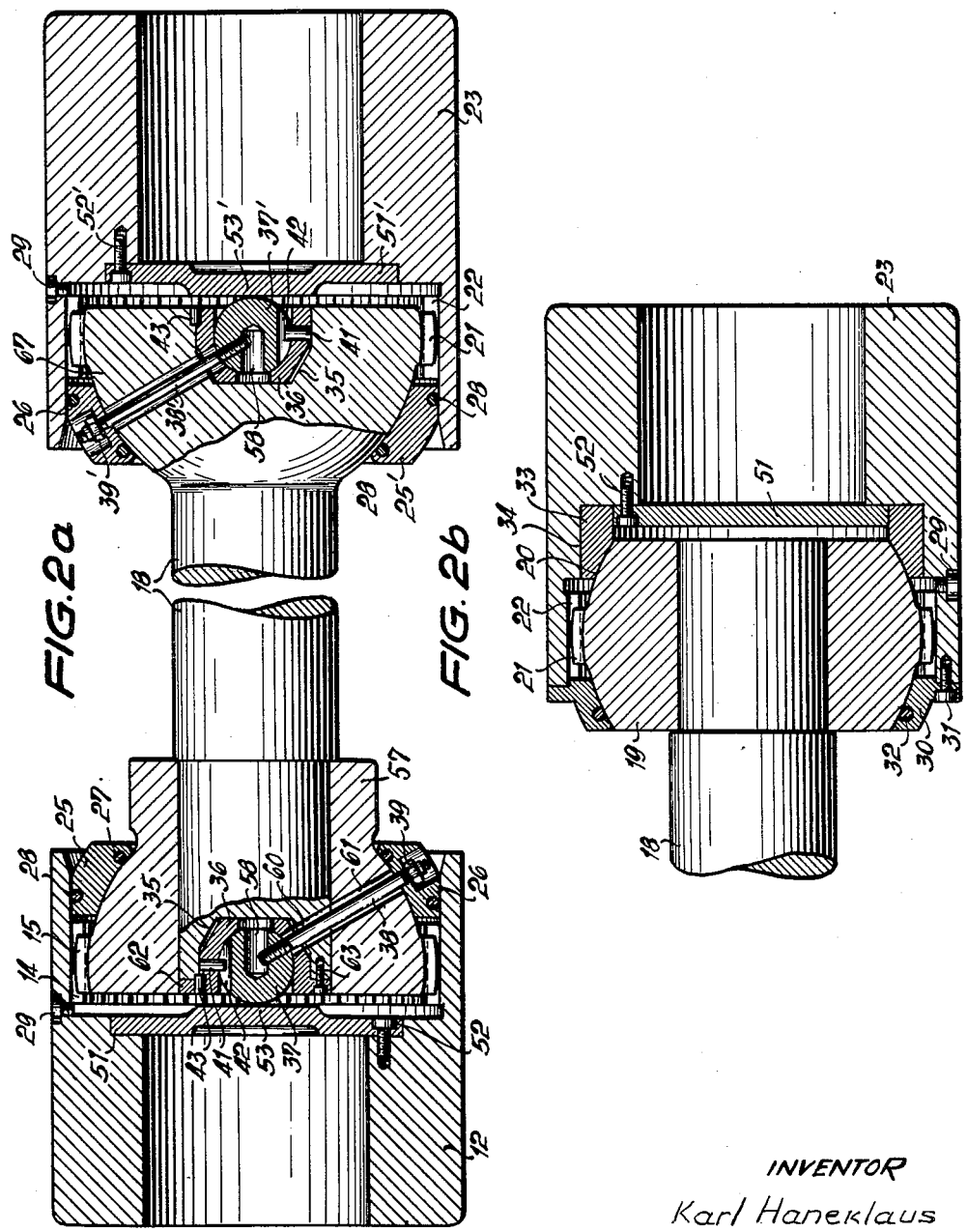

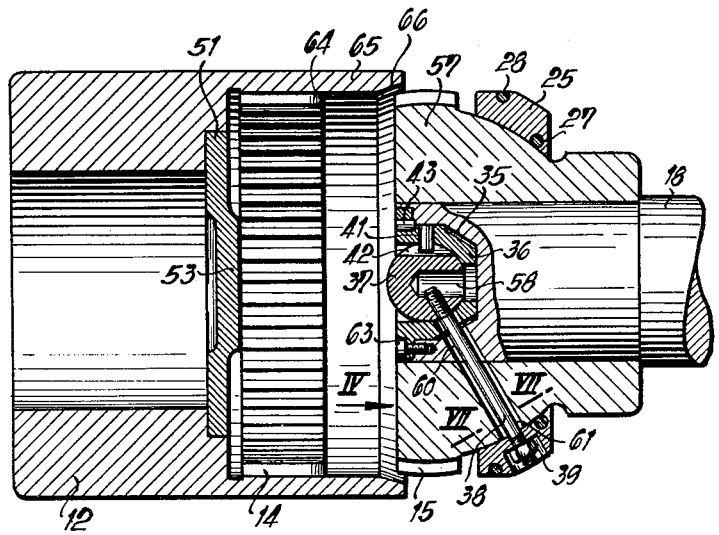

INVENTOR
Karl Haneklaus
BY
Richards & Geier
ATTORNEYS

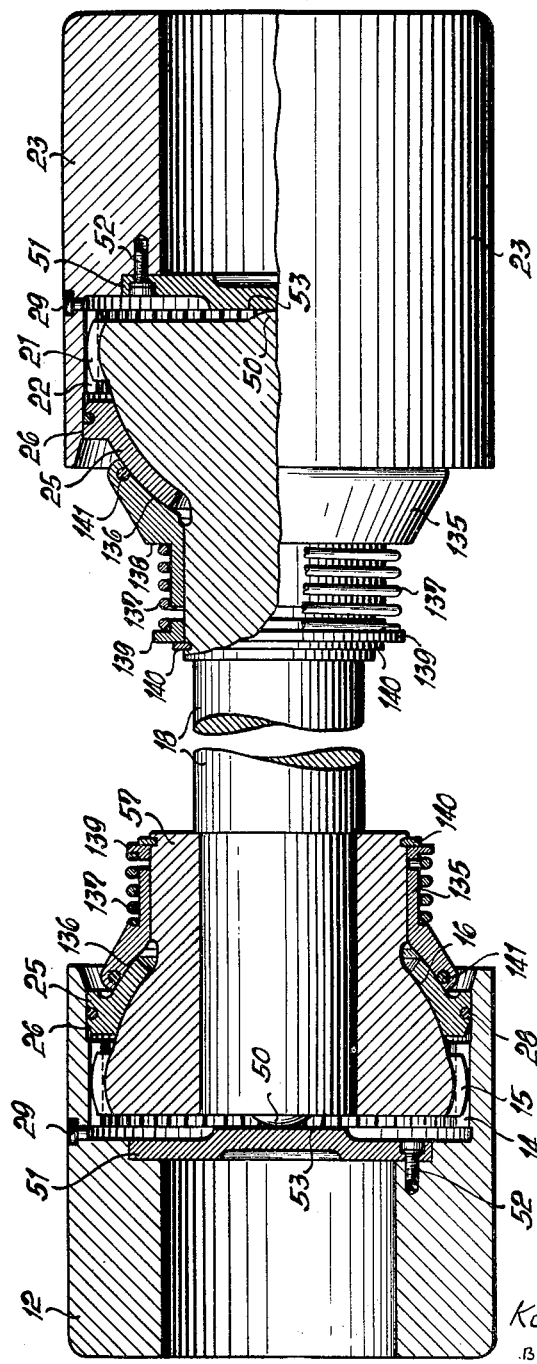

3,044,280
ARTICULATED-JOINT TOOTHED COUPLING
Karl Haneklaus, Rheine, Westphalia, Germany, assignor to F. Tacke KG., Rheine, Westphalia, Germany, a firm
Filed Jan. 25, 1961, Ser. No. 84,863
Claims priority, application Germany Jan. 30, 1960
13 Claims. (Cl. 64—8)

This invention relates to articulated-joint toothed couplings, in particular for rolling mills.

The rolls or rolling mills are generally driven via a cogged roller gear the cogged rollers of which are coupled with the individual rolls mounted in the roll stand via articulated-joint couplings and coupling spindles. The rolls of the roll stand are subjected to a considerable degree of wear and must be changed frequently, often even daily. It is therefore desirable that it should be possible to carry out this procedure with the smallest possible expenditure of work. On the other hand, however, the sealing of the articulated-joint couplings of the coupling spindles, which are filled with a lubricant, must not be detrimentally affected by the changing of the rolls. Furthermore, it must be remembered that the rolls and their profiles exhibit certain tolerances, so that the spacing between the roll stand and the cogged roller gear is not always the same. Furthermore, the rolls are often worn by rotation or abraded so that their central axes are not always identical with those of the cogged rollers. Thus, the articulated-joint couplings must be able to compensate for axial and radial movements, without leakage of lubricant during operation.

With the known constructional types of the articulated-joint couplings used in rolling mills, it is not possible to comply with these requirements or to comply completely with them.

It has therefore already been proposed to surround the articulated-joint couplings for coupling spindles in rolling mills with a cylindrical housing, which serves for sealing-off the articulation point, has a rather smaller diameter than the roll and is shrunk-on in oil-tight manner on to the coupling-former. The spindle head carries a collar provided at the side remote from the articulation point with a spherical surface and is flattened at its end which is pivotally mounted between two sliding contacts rotatable in a spherical recess formed in the coupling-former. The spherical surface of the spindle head collar is sealed off by a rubber ring inserted in fluid-tight manner and axially displaceable in the housing shrunk on the coupling-former and a corresponding spherical surface of which bears, under the action of axial springs, in sealing manner against the spindle head collar. It is true that a known constructional form of this kind permits an oil-tight seal of the articulation joint, but it makes the changing of the rolls difficult since it is then necessary to draw the coupling spindle with the articulated joint coupling and the coupling-former from the roll journals, and this requires a correspondingly large expenditure in respect of work and time.

It is the object of the invention to permit the changing of the rolls with the smallest possible expenditure of time and also without any necessity for releasing securing means, simultaneously permitting also relatively large parallel and angular displacement of the articulation point. For the articulated connection of the coupling spindle with the roll, use is made of a cardan toothed coupling the internally-toothed sleeve of which engages in a convexly curved external toothing of the spindle head constructed as a spherical surface. According to the underlying idea of the invention, the coupling sleeve secured on the roll journals is, without it being necessary to release securing means, adapted to be drawn off in the axial direction from the spindle head and is sealed off relatively to the latter by a metal slip ring the inner side of which, formed as a ball and socket joint, bears against the spherical surface of the spindle head and the cylindrical outer side of which is guided in a recess in the coupling sleeve. The said slip ring consists preferably of bearing metal, such as bronze or the like, and provides a reliable oil-tight seal of the coupling, without detrimentally affecting the displaceability thereof. When the roll is removed from the assembly, this ring remains on the spindle head.

In order to guarantee satisfactory sealing of the coupling, even in the case of considerable angular displacement of the magnitude of up to approximately 6°, according to a preferred embodiment of the underlying idea of the invention the slip ring is guided concentrically on the spherical surface of the spindle head by means of a retaining device which is so constructed that the roller can, without releasing any kind of securing means, be laterally removed and replaced in the shortest possible time by a new roll. This retaining device consists, in the sense of the invention, of a ball which is recessed into the radial central plane of the arcuate external toothing, in a corresponding recess in the middle axis of the spindle head and is connected with the slip ring via a plurality of connecting elements. These connecting elements consist for example of a plurality (for example three) of tie rods screwed at their inner end into the ball and engaging at their outer end in the slip ring. These tie rods extend through corresponding, oblique bores in the spindle head with a degree of play such that they are able to move freely and, practically speaking, carry out any desired movement of displacement. It is advisable to guide the ball in the recess in the spindle head which receives it in the peripheral direction, i.e. by means of a retaining member disposed in the radial central plane of the arcuate external toothing and permitting unilateral displaceability of the ball. Expediently, the ball is of steel and is guided in a spherical bushing inserted in the recess in the spindle head and made of bearing metal, such as bronze or the like; the said bushing is also secured against displacement relatively to the spindle head, for example by means of a pin.

Due to the connection of the outer slip ring, which is expediently provided with an inserted packing ring, which the ball centre by means of the tie rods, the spindle head is able, without being hindered by any additional application pressures, to move freely so that the coupling has considerable freedom for displacement. Nevertheless, the coupling is sealed-off in completely fluid-tight manner and it is not possible either for lubricant to leak out or for any impurities to penetrate into the coupling.

The arcuate external toothing can be worked directly into the spherical spindle head, so that the latter serves simultaneously as a coupling hub. In this case, the slip ring is expediently made in two parts, in order to facilitate the building-in thereof. In many cases, it is for constructional reasons advisable not to manufacture relatively large articulation spindles from a precision-forged part, but to secure the coupling hub on the end of the spindle, for example, by shrinking-on.

The end of the coupling spindle associated with the cogged roller gear can be provided in per se known manner with a spherical coupling hub carrying the arcuate external toothing. It is also possible to arrange on the gear-side end of the coupling spindle a coupling half constructed in the same way as at the roll-side end.

According to another feature of the invention the sealing ring, which is provided with a spherical cap and guided in the sleeve of the coupling as a slip ring, has a holding device consisting of a bushing which is of spherical concave shape and with the internal surface thereof rests on the slip ring under the action of a spring. The spring is supported at the surface of the spindle head remote from the external toothing and holds the slip ring on the ball-shaped surface of the spindle head also when the device is dis-coupled. The toothed coupling constructed in this manner is granted a particularly wide shift as the shift of the coupling sleeve is not hindered by bolts or any other fastening means. The elimination of supporting bolts also makes it possible to enlarge the surfaces of the spherical caps which results in diminution of pressure effective on said caps, and consequently lessens wear and prolongs useful life of the coupling. Also, as the toothed coupling is of simpler construction the cost of production is reduced.

Further details will be apparent from the following description and the drawings, wherein various embodiments of the invention are illustrated by way of examples. In the drawings:

FIGURE 1 shows a longitudinal section through a coupling spindle connected at both ends, via articulated-joint couplings with the roll and the cogged roller gear, the two axes being shown angularly displaced;

FIGURE 2a is a longitudinal section through a further embodiment;

FIGURE 2b is a partial longitudinal section of another embodiment, in both figures with the two axles not being displaced;

FIGURE 3 shows the roll-side coupling in the drawn-out state;

FIGURE 4 is an elevational view of the coupling hub in the direction of the arrow IV shown in FIGURE 3;

FIGURE 5 shows a part of FIGURE 3, drawn to a larger scale;

FIGURE 6 is a partial cross-section taken in the plane VI—VI of FIGURE 1;

FIGURE 7 is a partial cross-section in the plane VII—VII of FIGURE 3;

FIGURE 11 is a longitudinal section through still another coupling spindle with the two axes not being displaced.

Figure 8:
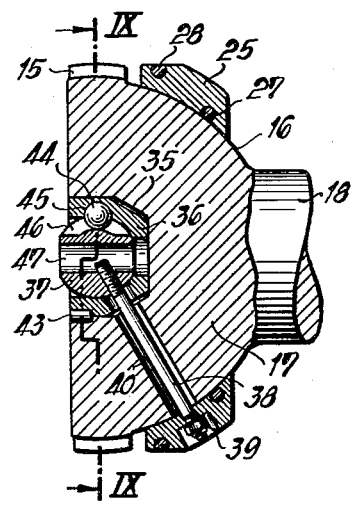
FIGURE 8 is a longitudinal section through a further embodiment of the spindle head.

Referring now to the FIGURE 1 of the drawings, secured on roll journal 11 of a roll stand is a coupling sleeve 12, made fast for example in accordance with an oil pressure process making use of a conical intermediate bushing 13. The coupling sleeve 12 can also be securely connected with the roll journal 11, in some other way, for example by keying on, shrinking on without an intermediate bushing or with the aid of multi-groove or flat-journal profiles. Cut in the coupling sleeve 12 is a cylindrical inner toothing 14 in which engages a convexly curved external toothing 15 of spindle head 17 constructed as a part of a spherical surface 16 and the other end of whose coupling spindle 18 carries a coupling hub 19 the spherical surface 20 of which has a convexly curved external toothing 21. The latter engages in the cylindrical internal toothing 22 of coupling sleeve 23 which is secured on shaft journal 24 of the cogged roller gear by means of the intermediate bushing 13, in the same manner as the roll-side coupling sleeve 12. It is also possible, as shown in FIGURE 2a, to construct the cogged roller gear side end of the coupling spindle 18 in the same manner as in FIGURE 1, with the spindle head 67 in which the external toothing 21 is directly machined. Instead of this, the spindle 18 may also be constructed in the same way as the gear-side spindle end, as a coupling hub 57 which is securely connected with the spindle 18 for example by shrinking-on or the like.

Against the spherical surface 16 of the spindle head 17 bears a slip ring 25 made of bearing metal such as bronze or the like and constructed inwardly as a ball and socket joint and the external side of which is cylindrical and is guided in a recess 26 in the coupling sleeve 12. Inserted on the concave inner side of the slip ring 25 is a sealing ring 27 and on its cylindrical external side is a sealing ring 28. Both sealing rings are of circular cross-section and consist of a resilient material, such as rubber or the like, and they prevent lubricant, which can be introduced through an aperture closed by a screw 29, from leaking out of the coupling.

The slip ring 25 is generally made in one part. If the spindle 18 is given two spindle heads 17 and 67 (FIGURE 2a), the slip ring 25 must be in two parts. Its two halves are then held together by screws which are not shown.

The right-hand coupling 19 to 23 associated with the cogged roller gear is sealed off by an annular cover 30 securely connected by screws 31 with the end face of the coupling sleeve 23 and is sealed off at its concave inner side by a sealing ring 32 of the same construction as the sealing ring 27 and 28 of the roll-stand-side coupling part, in order to prevent leakage of the lubricant filling the coupling housing, which said lubricant can also be introduced through the aperture closed by the screw 29. The side of the spherical surface 20 of the coupling hub 19 facing the gear journal 24 bears against a guide ring 33 the inner side of which is correspondingly concavely curved and inserted as a press fit in a recess 34 in the coupling sleeve 23. The inner guide ring 33 is simultaneously also retained by the screws 31.

On changing a roll, the coupling sleeve 12 remains in position on the roll journals 11 and is drawn off laterally, together with the roll, from the spindle head 17. As this is done, the coupling spindle 18 is supported, in order to permit easy insertion of the roll with the coupling sleeve 12 secured thereon. As this is done, it is not necessary to release any kind of securing or connecting elements.

Due to the varying diameter of the rolls, and after the latter have been subjected to wear, there is exhibited between the axes of the roll journal 11 and the gear journal 24 a parallel displacement which is designated $v$ in FIGURE 1 and requires to be transmitted by the coupling. From this parallel displacement there normally results an angular displacement of up to approximately 6° which, in special cases, may also be higher.

In order, also with this considerable oblique position, to achieve satisfactory sealing of the coupling, there is provided on the roll-side coupling half a concentrical sealing means which easily permits the lateral drawing-out of the roll without it being necessary to release any kind of securing elements and also permits the insertion within the shortest possible time of a new roll. During this changing of the rolls, the gear-side coupling half remains, unchanged, in engagement.

In order to achieve this spherically concentric seal, there is provided in the end face of the spindle head 17, in the axial centre thereof, a recess 35 lined with a bushing 36 of bearing metal, such as for example bronze. Inserted in this bushing 36 is a ball 37, made for example of steel, and into which are screwed for example three tie rods 38 upon which the slip ring 25 is secured by means of one nut 39 in each case arranged in a corresponding recess thereof. In order to compensate for the slight degree of wear taking place in the course of time on the spherical surface of the slip ring 25 and on the spherical surface 16 of the spindle head 17, it is possible to dispose under the nut 39 a spring ring, a disc, leaf or spiral spring. The tie rods 38 extend through the spindle head 37 in oblique bore holes 40 which have a diameter such that the tie rods 38 are able to move freely and with play therein and practically to carry out any desired displacement, as illustrated in FIGURE 6, in the displaced state, and in FIGURE 7, in the undisplaced state. These sections show that the tie rods are disposed in the centre of their bore 40 in the non-displaced state according to FIGURE 7 and circle, in the displaced state according to FIGURE 6, about the central axis of the bore 40.

The tie rods 38 can therefore not bear against the walls of the bore 40 as long as the permissible angular displacements are not exceeded.

In order to prevent the tie rods 38 from bearing against the walls of the bore 40 which receives them, the ball 37 is retained in the peripheral direction by means of a cylindrical roll 41 which is recessed into the bushing 36 and engages in a slot 42 in the ball. The cylindrical roll 41 is disposed in the radial central plane of the arcuate external toothing 15 and permits unilateral displaceability of the ball 37. The bushing 36 is secured, for its part, by means of an axial pin 43, so that it is not able to rotate in the recess 35 in the spindle head 17.

The ball 37 can also be inserted directly, without use of the bushing 36 in the recess in the spindle head 17.

Figure 9:
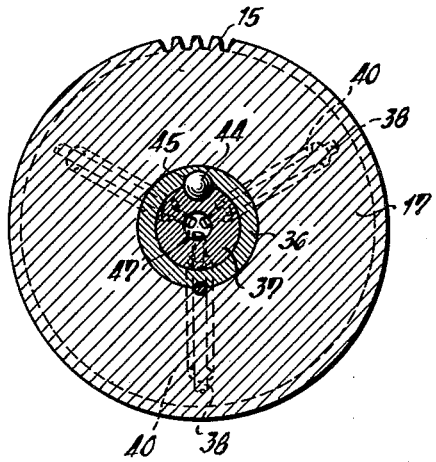
FIGURE 9 shows a cross section in the plane IX—IX of FIGURE 8.

Instead of being retained by the cylindrical roll 41, the ball 37 may also be retained against movement in the peripheral direction by means of a small ball 44, as illustrated in FIGURES 8 and 9. This ball 44 is inserted in a groove 45 formed in the bushing 36 and slides in a semicircular groove 46 in the ball 37. The small ball 44 prevents, in the same way as the cylindrical roll 41, the tie rods 38 from bearing against the walls of the bores 40 which receive them.

Due to the connection of the slip ring 25 with the centre of the ball 37, via the tie rods 38, the spindle head 17 is able to move freely, without being hindered by any additional application pressures. In this connection, the coupling also remains entirely fluid-tight, due to the provision of the sealing rings 27, 28 inserted in the slip ring 25 and it is not possible for lubricant to leak out or for any impurities to penetrate. For reasons connected with simple manufacture, the ball 37 is formed with a continuous bore hole 47 into which the inner ends of the tie rods 38 project.

The spherically concentric seal can also be applied on the gear-side coupling half, as illustrated for example in FIGURE 2 which shows the two coupling halves in the non-displaced state.

The balls 37, 37' can simultaneously serve for maintaining the spaces between the roll journals and the gear journals. For this purpose, radial discs 51, 51', retained by means of axial screws 52, 52', are recessed into the coupling sleeves 12 and 23. The discs 51, 51' may for example be provided with a concentric projection 53, 53' forming a bearing surface for the balls 37 or 37'. The side of the discs 51, 51' remote from the articulation point furthermore seals off the coupling sleeves 12 and 23 against the leakage of lubricant towards the roll or gear sides.

In the case of the embodiment according to FIGURE 2a, the arcuate external toothing 15 is not, as in the case of the constructional example according to FIGURE 1, machined directly into the spherical end of the spindle 18, but into a coupling hub 57 shrunk on to the shouldered end of the spindle 18. The tie rods 38 connecting the slip ring 25 with the ball 37 are guided through bores 60 in the spindle 18 and also through bores 61, flush with the bores 60, in the coupling hubs 57. The said bores 60, 61 have, practically speaking, no influence on rigidity since, in general, only three tie rods 38 are necessary.

The ball 37 can, as in the case of the embodiment according to FIGURE 1, be formed with a continuous bore 47 or also with a blind bore 58, as illustrated in FIGURE 2a. In this case, the bushing receiving the ball 37 is also provided with a flange-like projection 62 secured by means of screws 63 on the end face of the end of the spindle 18.

The gear-side coupling half can, in accordance with the sectional drawing in FIGURE 2a, be constructed in the same way as the roll-side coupling half, its arcuate external toothing 21, which engages in the cylindrical internal toothing 22 of the coupling sleeve 23, being either machined in the spherical end 67 of the spindle 18 or, in accordance with FIGURE 2b or of the embodiment according to FIGURE 1, provided in the coupling hub 19. According to the section drawing of FIGURE 2b, the gear-side coupling half is constructed in the same way as in the case of the embodiment according to FIGURE 1. In this case, the displaceability of the coupling half is achieved by means of the two ball and socket-shaped rings 30 and 33.

FIGURE 3 shows the roll-side coupling half in the drawn-out state, during the building in or out of the roll. The roll journal and also the coupling sleeve 12 secured thereon is drawn axially from the coupling hub 57 or from the spindle head 17 and, as this is done, it is unnecessary to release any kind of securing means. The coupling boss 57, with its sealing ring 27 and its spherically concentric retaining device, remains on the coupling hub 57 rigidly connected with the spindle 18. In the same position, after removal of the roll, a new roll is inserted with the coupling sleeve 12 secured on its roll journal.

In order to permit the coupling sleeve 12 to be inserted as rapidly and as simply as possible, so as to avoid any interruption in the work of the rolling mill, the teeth of the internal toothing 14 are provided on their outer end side with a pointed part 64. The coupling sleeve 12 is, as apparent from FIGURE 5, prolonged by a collar projecting over the toothing 14 and formed with a conical widened part 66 at its end. The inner diameter of the collar 65 is larger by the magnitude $h_1$ than the external diameter of the arcuate hub toothing 15 the end side of which is also formed with a pointed part 68. The said collar 65 permits, on introducing the coupling sleeve 12, a certain degree of centering between the latter and the spindle 18. Due to the larger diameter (by the magnitude $h_1$) of the collar 65, also the pitch diameters of the internal toothing 14 and of the arcuate external toothing 15 exhibit a certain degree of eccentricity. This eccentricity is compensated for by the greater curve height $h$ relatively to the difference in radius between the root line diameter of the inner toothing 14 and the inner diameter of the collar 65. Due to this additional measure, the insertion of the hub toothing 15 in the inner toothing 14 of the coupling sleeve 12 is considerably facilitated. Furthermore, the cylindrical inner walls of the collar 65 serve as a sliding surface for the slip ring 25 and also for the sealing ring 28 inserted therein.

FIGURE 4 shows a view of the coupling hub 57 in the direction of the arrow shown in FIGURE 3. The ball 37 is shown completely and the associated bushing 36 is shown partially in section. From this sectional drawing it will clearly be seen that the ball 37 is guided by the cylindrical roll 41 engaging in its groove 42 and is movable in all directions with the exception of the peripheral direction. The bushing 36 is retained at correct pitch relatively to the oblique bores 40 or 60, by means of the pin 43.

In all embodiments, the arcuate external toothings of the coupling hubs or of the spindle heads are centered in the tooth root of the internal toothing of the coupling sleeves. The slip ring provided with sealing rings bears, with its cylindrical external surface, on the coupling sleeve and, with its cylindrical internal surface, on the spherical surface of the coupling hubs or of the spindle head, in sealing manner, so that, for each coupling half and with all shaft displacements, a satisfactory seal with maintenance of complete movability is assured.

Figure 10:
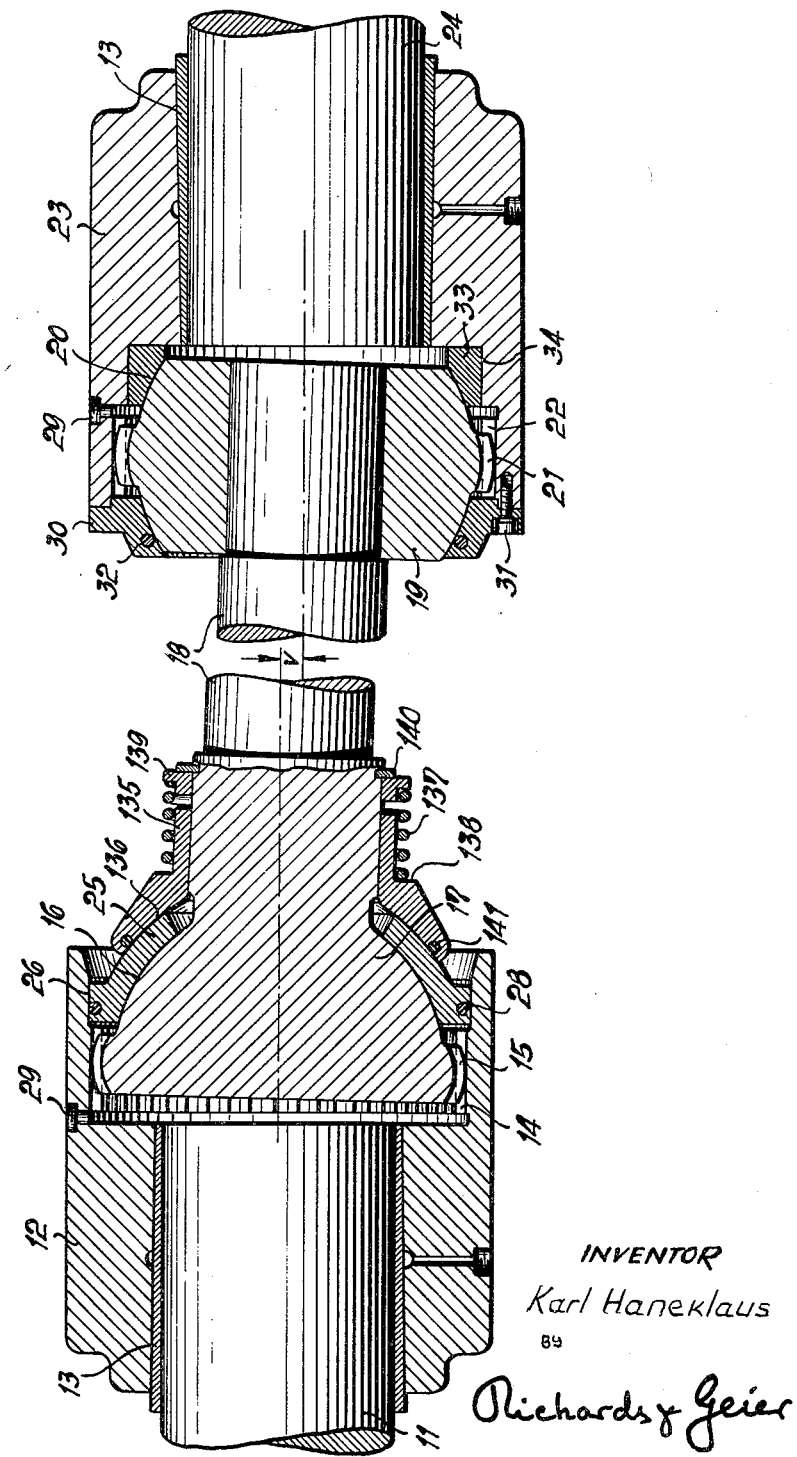
FIGURE 10 is a longitudinal section through another embodiment of a coupling spindle connected at both ends, via articulated-joint couplings, with the roll and the cogged roller gear, the two axes being shown angularly displaced.

Referring now to FIGURE 10, this embodiment is essentially the same as in FIGURE 1. Divergently therefrom, the slip ring 25, resting on the spherical surface 16 of spindle head 17, consisting of bearing metal, such as bronze or the like, and at its internal surface being spherically shaped, is supported against spindle head 17 by a bushing 135. With its spherically shaped part 136, said bushing 135 encloses the ball-shaped surface of slip ring 25 and is pressed on the latter by action of a coil spring 137 which is adjacent shoulder 138 of bushing 135 and has its counter-bearing in a ring 139 which is supported by spring ring 140 on the centre of spindle head 17. The spherical end of bushing 135 is provided with a sealing ring 141 adjacent external surface of slip ring 25 and sealing the latter. By spring 137 the spherical part 136 of bushing 135 is continually pressed against the slip ring 25 so that this stays on spindle head 17 also when the coupling sleeve 12 is removed. In this position the bushing 135 allows for swing of the spherical surface 16 of spindle head 17 in the spherical surface of sealing ring 141 so that the coupling is able to transmit even larger angular displacement, which in the drawing is indicated by $v$. Also spindle head 17 can freely move without hinderance from any additional pressure.

Figure 11A:
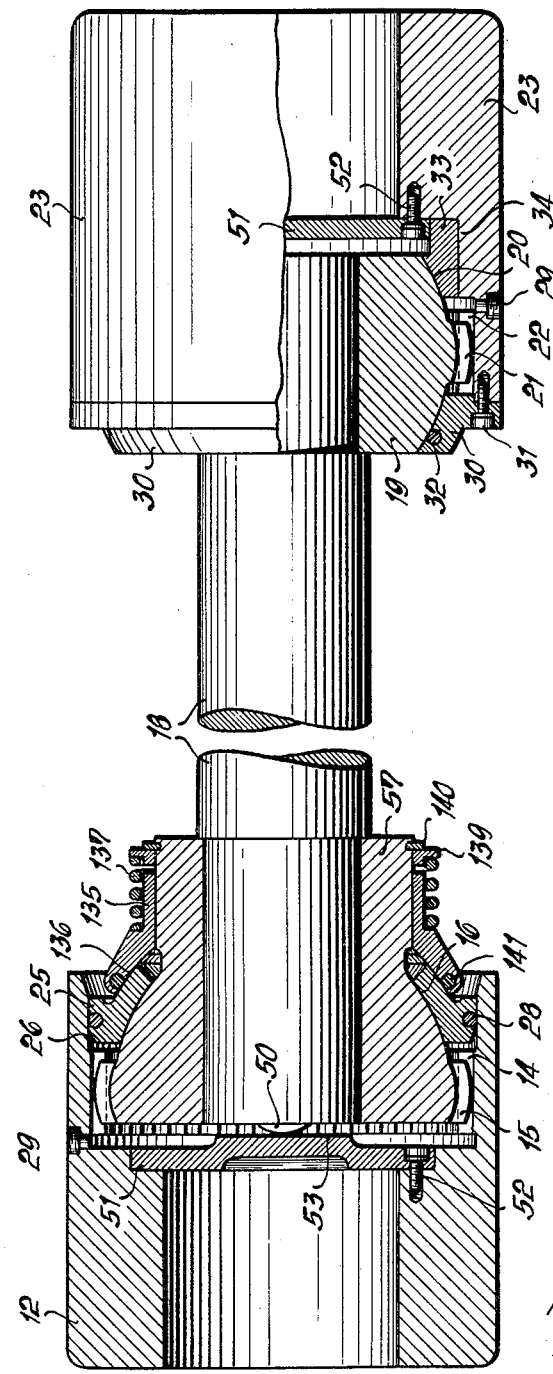
FIGURE 11a is a longitudinal section of a further embodiment.

A sealing equal to the ball-centered sealing at the roller side may be provided at the side of the roller-gear, as this is apparent in FIGURE 11 where the two halves of the coupling are shown with the axes not being displaced.

With this construction of the roller side coupling the arcuate external toothing 15 is worked into a hub 57 of the coupling which hub is shrunk on the stepped end of spindle 18. Apart from this, this construction is in agreement with FIGURE 10.

In order to maintain the distance between roller pin and gear pin a spherical surface 50 is provided at either end of spindle 18, and radial discs 51 which are sunk into the coupling sleeves 12 and 23 and fastened to them by axial screws 52 bear on said surface 50.

The discs 51 have a centrical shoulder 53 adjacent the spherical surface 50. Also, the discs 51 form a sealing of sleeves 12 and 23 in that they keep lubricants off the rollers and roller gears. In the embodiment represented in FIGURE 11a, the coupling half arranged at the side of the roller-gear is constructed in the same manner as in the embodiment of FIGURE 10 with the exception of disc 51, which has a plane form as shown in FIGURE 2b.

Since certain changes may be made in the above invention and different embodiments of the invention may be made without departing from the scope thereof, it is intended that all matter contained in the above described disclosure shall be interpreted as illustrative and not in a limited sense.

My claims are:
1. An articulated-joint toothed coupling, in combination a coupling sleeve, fastened to a shaft end and having an internal toothing, a coupling spindle with a spherical coupling head, a spherically arcuate external toothing on said coupling head, gearing with the internal toothing of said coupling sleeve, a sealing ring of concave spherical internal side, moveably mounted on said coupling hub, and with its cylindrical external side, slideably guided in said coupling sleeve, and means supporting said sealing ring on the coupling head of said coupling spindle, said means being adapted to allow displacement of the coupling head in the sealing ring.

2. In an articulated-joint toothed coupling for rolling mills, a coupling sleeve, fastened to the end of a roller journal and having an internal toothing, a coupling spindle with a spherical coupling head, a spherically arcuate external toothing on said coupling head, gearing with said internal toothing, a sealing ring of concave spherical internal side, moveably mounted on said coupling head and with its cylindrical external side slideably guided in said coupling sleeve, a recess, made in said coupling head in the radial center plane of its external toothing, a ball moveable in said recess, and holding elements, connecting said ball with said sealing ring.

3. The toothed coupling as described in claim 2 in which the ball in the recess of the coupling head is guided in tangential direction by means of a holding member arranged in the radial center plane of the coupling head.

4. The toothed coupling of claim 2 in which the ball movably mounted in the recess of the coupling head is provided with a groove, having a roll therein, which roll is fastened in the coupling head.

5. The toothed coupling as described in claim 2 wherein the ball movably mounted in the recess of the coupling head is provided with a groove, having a ball-shaped holding member therein.

6. The toothed coupling of claim 2 in which a bushing, made of bearing metal, is embedded in the recess of the coupling head, in which bushing the ball is mounted.

7. An articulated-joint toothed coupling, comprising a coupling sleeve, fastened to the end of a shaft and having an internal toothing, a coupling spindle with a spherical coupling head, a spherically arcuate external toothing on said coupling head, gearing with said internal toothing, a sealing ring of concave spherical internal side, moveably mounted on said coupling head and having a cylindrical external side, said sealing ring with its cylindrical external side being slideably guided in said coupling sleeve, a recess in said coupling head, said recess provided in the radial center plane of the external toothing of said coupling head, a ball movably mounted in said recess, a plurality of radial bores made in said coupling head and ending in the recess of said coupling head, tie rods, received in said bores and bearing against said sealing ring, said tie rods having such play in said bores that they are prevented from touching the bore walls when the coupling is angularly displaced up to 6°.

8. An articulated-joint toothed coupling for rolling mills, in combination a coupling sleeve, fastened to the end of a shaft journal of a roller and having an internal toothing, a second coupling sleeve, fastened to the journal of a gear and having an internal toothing, a coupling spindle with spherical ends, a spherically arcuate external toothing, arranged at either spherical end of said coupling spindle and gearing with the internal toothings of said two coupling sleeves, a sealing ring at either end of said coupling spindle, said sealing rings having a concave spherical internal side and being moveably mounted on the spherical ends of said coupling spindle and slideably mounted in said two coupling sleeves, and means supporting said two sealing rings on the two spherical ends of the coupling spindle, said means being adapted to allow displacement of the coupling spindle against the two coupling sleeves.

9. An articulated-joint toothed coupling, in combination a coupling sleeve, fastened to the end of a shaft and having an internal toothing, a coupling spindle with spherical head, a spherically arcuate external toothing on said spherical head, gearing with the internal toothing of said coupling sleeve, a sealing ring of concave spherical internal side, moveably mounted on said spherical head, and with its cylindrical external side slideably guided in said coupling sleeve, said coupling sleeve at its end, projecting over its internal toothing, having a collar, a conical extension in said collar, adapted to facilitate insertion of the sealing ring into the coupling sleeve, and means supporting said sealing ring on the spherical head of said coupling spindle.

10. The toothed coupling of claim 9, in which the internal diameter of the collar is larger by a slight degree than the external diameter of the spherically arcuate external toothing, which difference is compensated for by a larger curve height of the arcuate external toothing.

11. An articulated-joint toothed coupling, in combination, a coupling sleeve, fastened to the end of a shaft and having an internal toothing, a coupling spindle with spherical head, a spherically curved external toothing on said spherical head, gearing with the internal toothing of said coupling sleeve, a sealing ring of concave spherical internal side, moveably mounted on said spherical head, and with its cylindrical external side slideably guided in said coupling sleeve, a bushing, shiftably mounted on said coupling spindle and provided with a spherical part enclosing the spherical external end of said sealing ring, and elastic means, adapted to press the spherical part of said bushing against the sealing ring.

12. The toothed coupling of claim 11, wherein the bushing encloses the hub of the spherical head of said coupling spindle and is under action of a coil spring being supported against a ring fastened to the coupling spindle.

13. The toothed coupling of claim 11, including a sealing means provided at the internal surface of the spherical part of the bushing.

References Cited in the file of this patent
UNITED STATES PATENTS

| | | |
|---|---|---|
| 1,407,299 | Robertson | Feb. 21, 1922 |
| 1,512,840 | Flick | Oct. 21, 1924 |
| 2,906,106 | Hass | Sept. 29, 1959 |
| 2,943,463 | Shipley | July 5, 1960 |
| 2,968,936 | Croset | Jan. 24, 1961 |